US010044564B2

(12) United States Patent
Likkei

(10) Patent No.: US 10,044,564 B2
(45) Date of Patent: Aug. 7, 2018

(54) CONNECTING NODE FOR A COMMUNICATIONS NETWORK

(75) Inventor: Juergen Likkei, Stuttgart (DE)

(73) Assignee: ROBERT BOSCH GmbH, Stuttgart (DE)

( * ) Notice: Subject to any disclaimer, the term of this patent is extended or adjusted under 35 U.S.C. 154(b) by 614 days.

(21) Appl. No.: 14/125,235

(22) PCT Filed: Apr. 25, 2012

(86) PCT No.: PCT/EP2012/057563
§ 371 (c)(1),
(2), (4) Date: Mar. 14, 2014

(87) PCT Pub. No.: WO2012/167995
PCT Pub. Date: Dec. 13, 2012

(65) Prior Publication Data
US 2014/0185463 A1     Jul. 3, 2014

(30) Foreign Application Priority Data

Jun. 10, 2011   (DE) ........................ 10 2011 077 409

(51) Int. Cl.
*H04L 12/24*     (2006.01)
*H04L 12/40*     (2006.01)
(Continued)

(52) U.S. Cl.
CPC .......... *H04L 41/0816* (2013.01); *H04L 12/40* (2013.01); *H04L 12/46* (2013.01); *H04L 43/12* (2013.01); *H04L 49/15* (2013.01)

(58) Field of Classification Search
CPC ......... H04L 12/40; H04L 12/46; H04L 49/15; H04L 43/12; H04L 41/0816
(Continued)

(56) References Cited

U.S. PATENT DOCUMENTS 4,875,208 A * 10/1989 Furuhashi ............... H04L 45/00
                                                                        370/400
5,774,695 A     6/1998 Autrey et al.
(Continued)

FOREIGN PATENT DOCUMENTS

CN         1984003 A     6/2007
CN       101416442 A     4/2009
(Continued)

OTHER PUBLICATIONS

Herrewege et al. CANAuth—A simple, Backward Compatible Broadcast Authentication Protocol for CAN bus, Sep. 2011, p. 1-7.*
(Continued)

*Primary Examiner* — Andrew Lai
*Assistant Examiner* — Hoyet H Andrews, III
(74) *Attorney, Agent, or Firm* — Norton Rose Fulbright US LLP; Gerard Messina

(57) ABSTRACT

A connecting node for a communications network is described, especially for connection of a network element of the communications network to the communications network, wherein the connecting node has a first interface for connection of the network element to the connecting node and a second interface for connection of the connecting node to the communications network, wherein the connecting node is constructed to enable an exchange of data between the communications network and the network element via the first and second interface, and wherein the connecting node is constructed to read and/or to alter and/or to block data exchanged between the communications network and the network element.

24 Claims, 3 Drawing Sheets

(51) Int. Cl.
*H04L 12/46* (2006.01)
*H04L 12/26* (2006.01)
*H04L 12/933* (2013.01)

(58) Field of Classification Search
USPC .................................................. 370/250, 254
See application file for complete search history.

(56) References Cited

U.S. PATENT DOCUMENTS

| | | | |
|---|---|---|---|
| 7,170,853 B2* | 1/2007 | Remboski | H04L 12/42 370/225 |
| 7,415,508 B2* | 8/2008 | Reinold | H04L 12/4625 370/400 |
| 8,649,942 B2* | 2/2014 | Mitchell | A01M 7/0089 111/104 |
| 2003/0076221 A1* | 4/2003 | Akiyama | H04L 12/40182 340/12.32 |
| 2004/0186644 A1* | 9/2004 | McClure | A01B 69/008 701/50 |
| 2004/0254700 A1* | 12/2004 | Fehr | H04L 12/40 701/36 |
| 2005/0288834 A1* | 12/2005 | Heiniger | G05D 1/027 701/23 |
| 2006/0083250 A1* | 4/2006 | Jordan | H04L 12/4135 370/400 |
| 2010/0298994 A1* | 11/2010 | Mitchell | A01M 7/0089 700/283 |

FOREIGN PATENT DOCUMENTS

| | | | |
|---|---|---|---|
| JP | 2004249925 A | 9/2004 | |
| JP | 2006192970 A | 7/2006 | |
| JP | 2007158534 A | 6/2007 | |
| JP | 2009130535 A | 6/2009 | |
| WO | WO 03/021910 * | 3/2003 | H04L 67/12 |
| WO | WO 03021910 A1 * | 3/2003 | H04L 29/06 |
| WO | WO 2006044128 A3 * | 7/2006 | H04L 43/50 |

OTHER PUBLICATIONS

Herrewege et al., CANAuth—A simple, Backward Compatible Broadcast Authentication Protocol for CAN bus, Sep. 2011.*
International Search Report for PCT/EP2012/057563, dated Jan. 8, 2013.
Yadong et al., "Research Based on OSI Model", Communication Software and Networks, IEEE 3$^{rd}$ International Conference On, pp. 554-557, 2011.

* cited by examiner

CONNECTING NODE FOR A COMMUNICATIONS NETWORK

FIELD OF THE INVENTION

The present invention relates to a connecting node, and to a control unit, a communications network and a method.

BACKGROUND INFORMATION

Bus systems that connect a large number of electrical units to one another are known from modern motor vehicles. In order to improve the availability of those bus systems, various systems of bus guardians and/or software-based solutions are known.

SUMMARY

The problem underlying the present invention is solved by a connecting node and by a control unit, a communications network and a method.

The present invention relates to a connecting node for a communications network, the connecting node connecting a network element of the communications network to the communications network. In particular, a bus system of a motor vehicle may be concerned in this case. The connecting node according to the present invention has a first interface for connection of the network element to the connecting node and a second interface for connection of the connecting node to the communications network. The connecting node is constructed to enable an exchange of data between the communications network and the network element via the first and second interface. For that purpose, the connecting node has devices for reading and/or altering and/or blocking data exchanged between the communications network and the network element. That data exchange may be carried out bidirectionally or unidirectionally. In the case of a bus system or network element assessed as being fault-free, the connecting node according to the present invention forwards the data exchanged through it in general in a completely unaltered ("transparent") form. Accordingly, it is also not necessary for the connecting node according to the invention to be integrated into the communications network to be protected, for example using an electronic identification or identity. Rather, the connecting node is able to perform its functions "invisibly" to the network elements, and protects the communications network in particular from threats arising within the communications network. The connecting nodes act as it were as "mini-firewalls" distributed in the communications network.

To perform the function according to the invention, the connecting node may inter alia also monitor a time behavior of the respectively associated network element, for example a number of messages per unit of time may be ascertained and compared with a preset. As a supplementary measure, it is possible to ascertain and/or to enforce a waiting time of the network element, that is, a period of time between an initialization of the communications network and a dispatching of a first message by the network element.

The connecting node may be implemented in any desired proportion as an electronic circuit or by a computer program. For example, the connecting node may be at least partially implemented as a so-called "ASIC" (application-specific integrated circuit) or as an "FPGA" (freely programmable integrated circuit).

Furthermore, the connecting node may be constructed in such a manner that it automatically authenticates the associated network element, for example using a so-called "PUF-method" ("physical unclonable function"). In addition, the connecting node according to the present invention is able to monitor the energy supply line of the communications network and if applicable report malfunctions to the control unit.

The communications network or the bus system may be implemented in almost any desired form, for example as a serial or parallel bus or as an optical network. The connections made by the communications network may likewise be in various forms. For example, the communications network may have a simple linear or line structure where two or more connecting nodes representing so to speak the stations of the communications network are connected along the line. Equally, the communications network may be branched or arranged in a star shape, or it may at least partially include a ring structure.

The connecting node according to the present invention may be operated as a supplement to and independently of other monitoring devices of the communications network and has the advantage that it is able to protect a communications network, especially a bus system of a motor vehicle, particularly well. Consequently, it is possible to increase the availability of the communications network. For example, the communications network may be protected against malicious manipulation or an erroneous permanent engagement of one or more network elements, or the sending of non-authorized messages by modified or sabotaged network elements may be prevented. In addition, the communications network may also be monitored for other faulty behavior of a network element and if applicable protected against that behavior. The decentralized protection function provided by the present invention may be "real-time capable" and may, for example, alter or block the data exchange to be monitored, without any significant additional delay. Furthermore, the present invention may also be applied to sub-networks of a communications network, with corresponding advantages being obtained.

The connecting node according to the present invention is disposed in each case decentrally between the communications network and the respective network element connected thereto, and is therefore able to monitor the data exchange irrespective of the connected network element. Furthermore, the connecting node may be operated independently of other connecting nodes of the communications network and may be operated both in dependence on and independently of the higher-ranking control unit. The connecting node may therefore be permanently configured or may be flexibly reconfigured by the control unit during operation. An encrypted data exchange with the control unit is also possible. The range of application of the present invention is therefore "scalable" within comparatively wide limits. Furthermore, the connecting node makes possible a dynamic configuration of the communications network during operation by virtue of the fact that it is possible to switch between various operating modes of the communications network. In addition, the present invention makes it possible to operate the communications network, if required, in an operating mode referred to as "degraded mode" or to implement an exclusive communications channel for a sub-network of the communications network. Furthermore, the present invention may be of an especially inexpensive construction, inter alia because existing network elements do not have to be modified.

In particular, it is provided that the connecting node has a third interface for connection to the control unit which controls the connecting node. According to the invention, "control" is understood as meaning that a data exchange between the control unit and the connecting node takes place in such a manner that both elements are able to communicate with each other, and/or in such a manner that the connecting node may be initialized by the control unit at the start of operation or configured by the control unit during operation. During that initialization or configuration, the connecting node may, if required, temporarily disconnect the associated network element from the communications network. If malfunctions in the associated network element and/or the communications network are recognized by the connecting node, the connecting node is able to send to the control unit via the third interface a corresponding message which may include inter alia an error code or a device ID. Preferably, the third interface is logically and/or physically separate from the communications network and from the data transmitted over the communications network.

With the aid of third interface, the connecting node may be controlled or may communicate via a separate channel independently of a status of the communications network. The connecting node according to the present invention therefore operates independently of the object that is to be monitored. That is very advantageous precisely in the event of a fault. Alternatively or in addition, the connecting node may, however, also be controlled via the communications network itself. For that purpose, the separate channel is able to use—for example with the aid of frequency division multiple access, FDMA, or a comparable technique—the physical lines of the communications network. That provides an additional safety function and ultimately increases the availability of the communications network still further.

It is especially advantageous that the connecting node according to the invention is structurally and/or electrically independent of the communications network and of the network element. As a result, any malfunctions of the network element cannot have an adverse effect on the function of the connecting node.

In addition, the connecting node according to the invention may be constructed to read and/or to alter and/or to block data of an OSI 2 layer and/or of an OSI 3 layer and/or of an OSI 7 layer. The abbreviation "OSI" stands for "open systems interconnection" and refers to a layer model of the International Organization for Standardization (ISO) which was developed as the basis for various communications protocols. The connecting node is therefore able to intervene comparatively "deeply" in the data exchanged through it and may therefore perform a correspondingly thorough monitoring of the communications network.

In particular, it is provided that the connecting node according to the invention is constructed to perform at least one of the following functions:

reading and evaluating additional information accompanying the exchanged data, especially a CAN ID or an Ethernet and/or IP address and/or a MAC (media access control) address;

ascertaining, assessing and/or altering a communications structure describing the exchange of data, especially a direction of the data flow in relation to the network element;

ascertaining a status and/or a behavior of the network element in relation to the data exchanged with the communications network;

comparing the exchanged data and/or the status and/or the behavior of the network element with predefined data and/or a predefined status and/or a predefined behavior, respectively;

assessing the exchanged data and/or the status and/or the behavior of the network element;

altering and/or blocking data, especially data deviating from a preset;

supplementing data sent from the network element and having a specific CAN ID or Ethernet and/or IP address by a signature, especially by an HMAC method (keyed-hash method authentication code);

checking a or the signature of data received via the communications network; and/or forwarding the received data to the network element after the signature has been recognized as correct.

Thus, a large number of advantageous properties or functions of the connecting node are described with which it is able to protect the communications network particularly well and increase the availability accordingly.

One embodiment of the present invention provides that the connecting node is constructed to receive control commands from the control unit via the communications network as an alternative to or in addition to the third interface. In that manner, the control of the at least one connecting node in the communications network may be carried out with redundancy and hence especially reliably.

In accordance with another advantageous embodiment, the connecting node is constructed to log data that has been read or information derived therefrom. Thus, the data exchanged via the connecting node may be read, linked, compared with presets ("filter patterns") and assessed. The results ascertained in that manner may be stored locally in the connecting node and/or may be transmitted to higher-ranking elements of the communications network, especially to the control unit. There, the results may be additionally linked, compared with presets, evaluated and/or stored. Furthermore, on the basis of the results, a log or an error message may be transmitted from the connecting node to the control unit and from the control unit to an open-loop and/or closed-loop control device of the motor vehicle. Even acoustic or optical information to the driver of the motor vehicle is possible. Safety-critical bus messages in relation to the vehicle may be signed, whereby data authenticity is increased and reliable logging by a dedicated bus station or the control unit is made possible.

It is especially advantageous for the connecting node to be disposed in a wiring harness of the communications network or in a plug connector of the wiring harness of the communications network. For example, the connecting node may be disposed in a plug or in a socket of the wiring harness or may be disposed therebetween as a plug-socket adapter. That saves on installation space and simplifies the placement of the connecting node. As already mentioned, in the case of a bus system or network element assessed as being fault-free, the connecting node according to the invention forwards the data exchanged through it in general in a completely unaltered ("transparent") form.

In a further embodiment of the present invention, the connecting node may alternatively be structurally combined with the network element. In that case, the connecting node is, however, independent of the network element functionally and in relation to the electrical power supply. In particular, the third interface for connection to the control unit is also independent of the network element. Owing to the proximity thereby achieved, the first interface for connection of the network element to the connecting node may on both sides be constructed without an expensive electrical circuit ("physical layer"). Considerable cost savings may be made in that manner. It is not absolutely necessary in that case for the third interface to be constructed as a separate connection to the connecting node if the connecting node physically communicates with the control unit via the communications network.

The present invention further relates to a control unit for a communications network, which is constructed to communicate with at least one connecting node and/or to control the at least one connecting node. The control unit is a higher-ranking unit with which the functions of connecting nodes distributed over the communications network are coordinated with one another. In that manner, the structure of the communications network as a whole may be monitored and, if appropriate, altered in a coordinated fashion so as to obtain best possible operation of the communications network even in the event of a fault. This may be effected, for example, by a reconfiguration or re-initialization of the connecting nodes and/or network elements. In addition, the control unit is able to communicate with other control devices or, if required, automatically output reports to the instrument panel or the like.

As a supplementary measure, it is provided that the control unit performs the communication with the at least one connecting node and/or the control at least partially in an encrypted manner and/or with the aid of a signature. In that manner, the function of the connecting nodes according to the invention is additionally safeguarded and, for example, also protected against malicious manipulation.

A further embodiment of the present invention provides that the control unit is constructed to control the at least one connecting node via a channel that is separate from the communications network and/or via the communications network, or to communicate with the at least one connecting node via those connections. The separate channel, which is connected to the mentioned third interface of the respective connecting nodes, makes possible a preferred and especially simple and reliable communication between the control unit and the connecting nodes. In particular, the data exchange over the communications network is not altered and any interruptions or short-circuits of the communications network are not able to impair the communication between the control unit and the connecting nodes. The separate channel may be linear, star-shaped or ring-shaped. Where appropriate, the channel may also be structurally integrated in the wiring harness of the communications network and/or may use the same physical lines and in that case be decoupled with the aid of an FDMA method.

The present invention further relates to a communications network, especially a bus system of a motor vehicle, which connects at least two network elements to each other, wherein at least one network element is connected to the communications network via a connecting node according to the invention. For example, the communications network may be a CAN bus system of a motor vehicle. The present invention is able to increase the availability of the communications network and thereby improve the driving safety of the motor vehicle.

The communications network according to the present invention may be equipped in such a manner that the at least one connecting node is disposed in the communications network as a supplement to a monitor disposed in a network element. Owing to the above-described properties of the at least one connecting node and of the control unit, other bus guardians, for example a bus guardian of a "Flex-Ray" system, are not adversely affected. Consequently, the availability of the communications network as a whole may be further increased. At the same time, protection against deliberate, malicious manipulation of the network element is additionally obtained.

The communications network according to the present invention is preferably constructed to process asynchronous and/or non-deterministic protocols, especially so-called CSMA protocols in a CAN bus system or in an Ethernet/IP system. "CSMA" stands for "carrier sense multiple access" and refers to a decentralized method for obtaining access rights in telecommunications and in similar networks. "CAN" means "controller area network" and refers to a bus system used in automotive electronics and in automation technology.

The present invention further relates to a method for operating a communications network, in which, with the use of a control unit and an independent channel and at least one connecting node, data between the communications network and at least one network element are read and/or altered and/or blocked.

In particular, for the method according to the invention it is provided that in the event of a malfunction and/or an overloading of the communications network a communications structure of the communications network is altered by the at least one connecting node being controlled by the control unit. In that manner, the structure of the communications network may be altered in a coordinated fashion— for example as a dynamic reaction to overloads or other malfunctions in the network. In particular, less important bus messages may be discarded and/or less important sending network elements may be disconnected from the communications network. Where appropriate, an exclusive communications channel for a sub-network may be created—for example using the separate channel.

Features of importance for the invention are also to be found in the drawings which follow, it being possible for the features to be important for the invention both individually and in different combinations, without explicit reference being made to this again.

Examples of embodiments of the present invention are described below with reference to the drawings.

DETAILED DESCRIPTION

Figure 1:
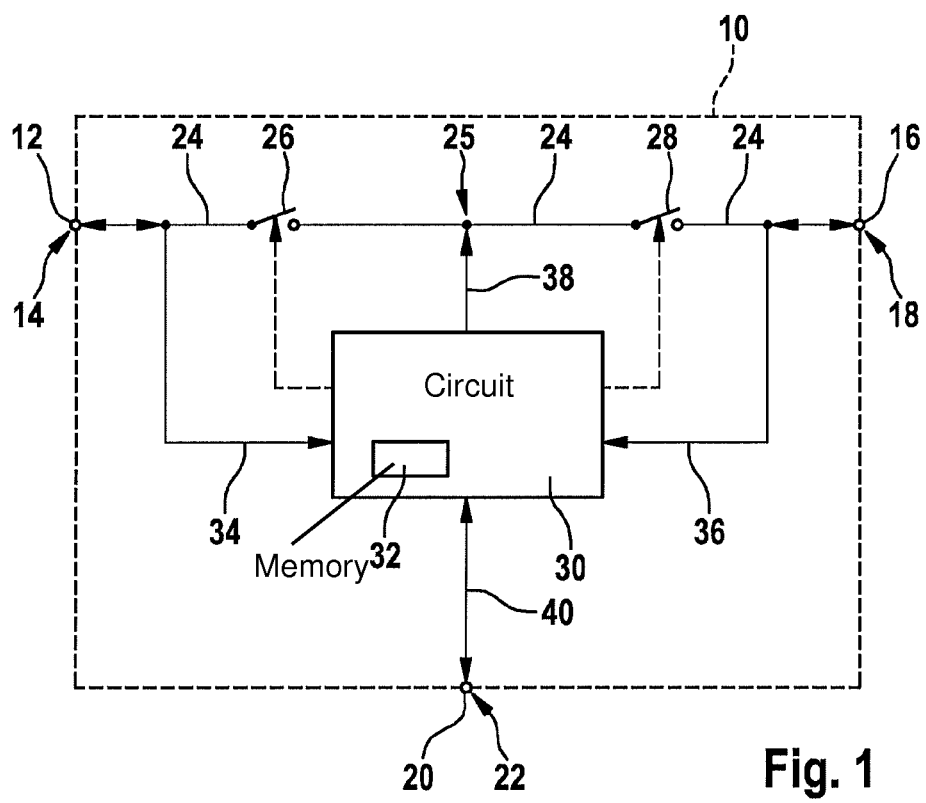
FIG. 1 shows a block circuit diagram of a connecting node.

The same reference numerals will be used for functionally equivalent elements and quantities in all of the Figures even in the case of differing embodiments.

FIG. 1 shows a block diagram of a connecting node 10 according to the present invention. Connecting node 10 has a first interface 12 for connection to a network element 14 (see FIG. 2), and has a second interface 16 for connection of connecting node 10 to a communications network 18 (see FIG. 2). In addition, connecting node 10 has a third interface 20 for connection to a control unit 22 (see FIG. 2) which controls connecting node 10. In a preferred embodiment, connecting node 10 is of a substantially symmetrical construction with respect to first and second interface 12 and 16.

Connecting node 10 includes a bidirectional data path 24 between first interface 12 and second interface 16, data path 24 being divisible into sections by two switches 26 and 28. Data 25 are exchanged between first interface 12 and second interface 16 via data path 24. In the present case, first and second interface 12 and 16 are electrical, but an optical form of implementation is equally possible. A circuit 30 includes further devices of connecting node 10, inter alia a memory 32. Circuit 30 is connected to data path 24 at suitable points by data lines 34, 36 and 38. A bidirectional control line 40 connects circuit 30 to third interface 20.

Connecting node 10 is preferably disposed in close proximity to its associated network element 14, but is independent of network element 14. Accordingly, connecting node 10 is structurally separate from network element 14 and also has a power supply that is independent of network element 14. The latter also applies in the case of connecting node 10 being disposed as a structural unit with network element 14.

In a first embodiment, connecting node 10 is not connected to control unit 22 and therefore operates automatically. For that purpose, data for configuring connecting node 10 were stored in memory 32 during the manufacture of connecting node 10 and/or during commissioning of communications network 18. Those data specify the preset mode of operation of connecting node 10.

In a further embodiment, connecting node 10 is connected to control unit 22 and may be controlled by control unit 22, that is to say, connecting node 10 is able to communicate with control unit 22 and may be initialized and/or configured by control unit 22. That is effected, for example, by bidirectional data communication between connecting node 10 and control unit 22. Preferably, that connection is made via third interface 20 and via a channel 42 (see FIG. 2) which is separate from and therefore independent of communications network 18.

In addition or alternatively, connecting node 10 is connected to control unit 22 not by third interface 20 but via communications network 18. Consequently, separate channel 42 between connecting node 10 and control unit 22 is not required.

In normal operation of connecting node 10, switches 26 and 28 are closed, that is to say, data path 24 is connected between first interface 12 and second interface 16. The data transfer between first interface 12 and second interface 16 accordingly takes place in unaltered ("transparent") form. Where applicable, connecting node 10 includes one or more amplifiers, level converters, pulse-forming means, shift registers or the like so that the bidirectional signals exchanged via interfaces 12 and 16 are passed on as correctly as possible. Those elements are not, however, illustrated in FIG. 1.

Circuit 30 is able to read data 25 exchanged at interfaces 12 and 16 with the aid of data lines 34 and 36 and is able to continuously compare those data with presets stored in memory 32 and to assess those data. In particular, additional information accompanying data 25, such as, for example, a CAN ID or an Ethernet (e.g. MAC) and/or IP address, may be read, compared and assessed. From that it is possible to ascertain a status and/or a behavior of the connected network element 14. Depending on the comparison or assessment, data 25 may be altered with the aid of data line 38, that is, may be written or deleted. The alteration of data 25 may involve individual bits, bytes or even entire data packets.

In addition, data 25 sent from network element 14 and having a specific predefined CAN ID or Ethernet/IP address may be supplemented by a signature, for example by a so-called HMAC method ("keyed-has message authentication code"). Correspondingly, received data 25 may be checked in relation to its signature. If the respective signature has been recognized as being correct, data 25 may be forwarded to the associated network element 14. If, on the other hand, the signature is not correct, connecting node 10 is able to alter or at least partially block those data 25.

In particular, circuit 30 and connecting node 10 are constructed to read and/or to alter and/or, if necessary, to block data 25 of an OSI 2 layer ("open systems interconnection") and/or of an OSI 3 layer and/or of an OSI 7 layer. Data 25 that deviate impermissibly from a respective preset are "filtered out", for example are therefore blocked or replaced by zeros. It is, however, equally possible according to the invention for data 25 exchanged via connecting node 10 to be altered if appropriate, so that those data correspond to the respective preset and hence network elements 14 are able to send and receive data 25 that is as correct as possible. This is preferably done with knowledge of the communications structure underlying communications network 18, which structure is permanently stored in connecting node 10 and/or control unit 22 or which may also be altered during operation. Optionally, information transmitted via third interface 20 may also be encrypted. For that purpose, circuit 30 has appropriate devices for encrypting and decrypting.

In the present case, connecting node 10 and circuit 30 are in the form of an ASIC (application-specific integrated circuit). Correspondingly, the two switches 26 and 28 are also integrated and, for example, are in the form of transistors, digital gates, multiplexers or the like. Alternatively, it is possible for connecting node 10 to be at least partially in the form of an FPGA (freely programmable integrated circuit) or implemented with the use of another suitable technology. It should be noted that, in FIG. 1, data path 24 and switches 26 and 28 are illustrated merely schematically and that, owing to the bidirectional data exchange, a different circuit structure may possibly be sensible.

Figure 2:
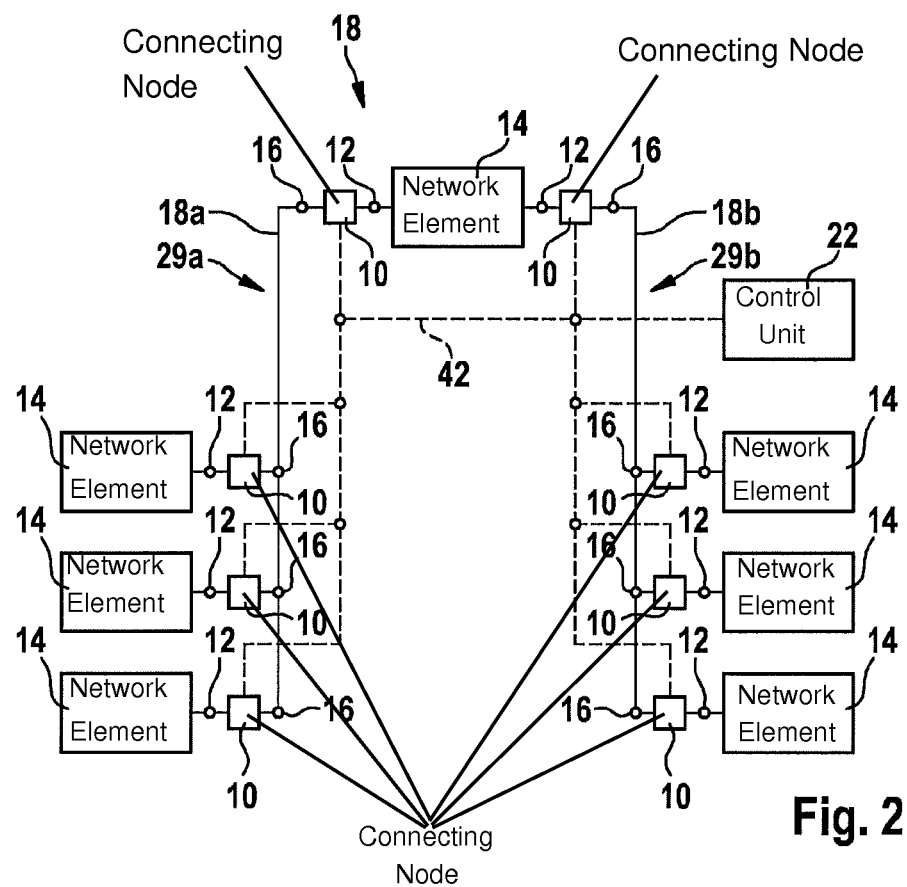
FIG. 2 shows an embodiment of a communications network according to the invention.

FIG. 2 shows an example of communications network 18 which in the present case is a bus system of a motor vehicle (not shown). Communications network 18 of FIG. 2 is in the form of two sub-networks 18a and 18b, one in the left-hand region and one in the right-hand region of the drawing. The sub-networks 18a and 18b are each implemented with the aid of a respective wiring harness 29a and 29b.

A total of seven network elements 14 are connected to communications network 18 via a total of eight connecting nodes 10. Connecting nodes 10 have for that purpose a first interface 12 and a second interface 16, as already shown in FIG. 1. A network element 14 that is the topmost network element in FIG. 2 is connected via two mutually independent connecting nodes 10 to a respective one of the two sub-networks 18a and 18b. Three of the remaining six network elements 14 are each connected via a connecting node 10 to sub-network 18b.

Control unit 22 illustrated at top right in the drawing is connected to the eight connecting nodes 10 by channel 42. For that purpose, channel 42 is connected to the respective third interfaces 20 of connecting nodes 10. Channel 42 is separate from communications network 18, or rather from sub-networks 18a and 18b. In particular, channel 42 does not have a direct electrical connection to communications network 18.

Separate channel 42 may, for example, be an electrical or optical connection that is independent of communications network 18 and which is separate or structurally disposed in wiring harness 29a and 29b of communications network 18. Separate channel 42 may have, at least in part, a linear, branched, star-shaped and/or ring-shaped structure.

Network elements 14 illustrated in FIG. 2 are, for example, control devices for controlling an internal combustion engine, an exhaust gas system and/or an automatic transmission of the motor vehicle. Equally, network elements 14 may be other, smaller units connected to the CAN bus system. Control unit 22 is preferably a structurally independent device of the motor vehicle, as illustrated in the drawing. Alternatively, control unit 22 may be structurally and/or electrically integrated in one of network elements 14 or in one of the control devices of the motor vehicle. Equally, connecting nodes 10 may advantageously be fixedly disposed in wiring harness 29a and 29b of communications network 18 or in a plug connector housing of wiring harness 29a and 29b. This is possible in an especially simple manner if, as described above, connecting nodes 10 are implemented with an ASIC.

Control unit 22 and, where applicable, connecting nodes 10 have memories 32 in which inter alia the communications structure of communications network 18 is stored. It is possible in this case for a particular communications structure to be permanently specified or alternatively to be altered by control unit 22 during operation. As described above, communications network 18 illustrated in FIG. 2 is electrical in the form of a CAN bus system, but according to the invention an optical embodiment of communications network 18 is equally possible.

Connecting nodes 10 are also constructed to log data 25 exchanged over data path 24 or information derived therefrom. Exchanged data 25 may be read, linked together, compared with presets and/or assessed. The results ascertained in that manner may be transmitted via channel 42 to control unit 22. There, the results may be additionally linked, compared with presets, evaluated and/or stored. Furthermore, on the basis of the results, a log or error message may be transmitted to one or more control devices of the motor vehicle. Even acoustic or optical information to the driver of the motor vehicle is possible.

Control unit 22 is able to communicate with connecting nodes 10 of communications network 18 in virtually any desired manner and/or is able to initialize connecting nodes 10 after a supply voltage has been switched on. Control unit 22 is able to configure connecting nodes 10 also during operation, for example in order to optimize the communications structure of communications network 18 or adapt it to any malfunctions that may occur.

The use of connecting nodes 10 according to the invention in communications network 18 makes it possible to protect the illustrated bus system of the motor vehicle particularly well and thus increase the availability of the communications network 18. The two sub-networks 18a and 18b of FIG. 2 may even be protected independently of each other. Other than as shown in the drawing, communications network 18 may also have a different number of connecting nodes 10. Equally, it is possible for not all of connecting nodes 10 used to be connected via channel 42, for example when connecting nodes 10 are permanently configured for a respective task and transmission of logs to control unit 22 is not necessary. It is also conceivable for not all network elements 14 to have a connecting node 10 assigned thereto.

Furthermore, as an alternative, it is possible according to the invention to carry out the initialization and/or the configuration of connecting nodes 10 and/or the transmission of the logs via communications network 18 instead of via separate channel 42. That makes it possible for connecting nodes 10 to operate properly even in the event of any malfunctions of channel 42. It is equally conceivable for the invention to be implemented at especially favorable cost by dispensing generally with channel 42. In that manner, the invention may be appropriately "scaled" in terms of costs on the one hand and function on the other hand, according to the particular requirements.

In an alternative embodiment, not shown, connecting node 10 is structurally combined with network element 14. In that case, connecting node 10 is, however, independent of network element 14 functionally and in terms of the electrical power supply. In particular, third interface 20 for connection to control unit 22 is also independent of network element 14. Consequently, a comparatively expensive electrical circuit ("physical layer") at first interface 12 between network element 14 and connecting node 10 may be dispensed with on both sides. Considerable cost savings may be made in that manner. Where appropriate, connecting node 10 may even be integrated in the electrical circuit ("physical layer") of network element 14, which circuit is used for connection to communications network 18. Preferably, connecting node 10 may be functionally disposed between the electrical circuit used for connection to communications network 18 and the remainder of network element 14. This too is not illustrated in FIG. 2. Furthermore, it is not absolutely necessary for third interface 20 to be constructed as a separate connection to connecting node 10 if connecting node 10 physically communicates with control unit 22 via communications network 18.

Figure 3:
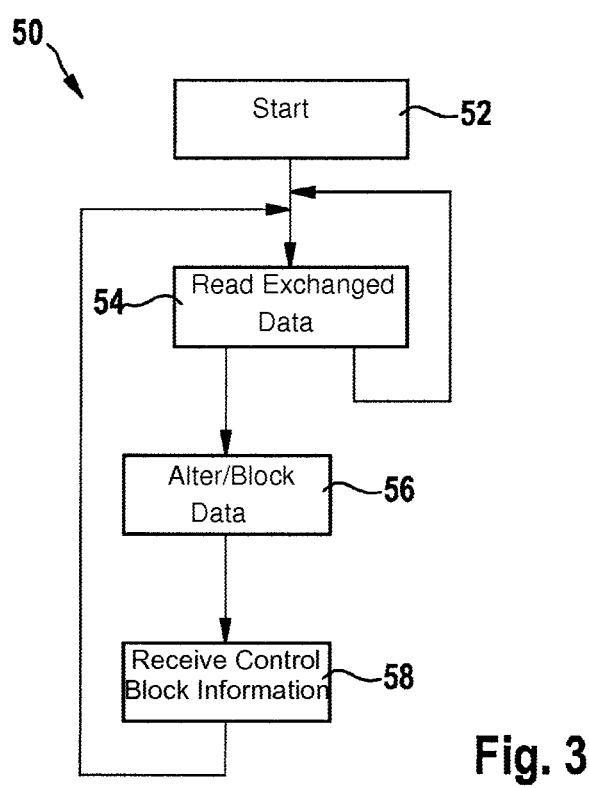
FIG. 3 shows a flow diagram for carrying out a method for operating the communications network.

FIG. 3 shows a simple flow diagram for carrying out a method 50 for operating communications network 18. The sequence shown in FIG. 3, which essentially characterizes the behavior of a connecting node 10, begins in a start block 52 illustrated in the upper region of the drawing.

In a block 54 which follows, data 25 exchanged over data path 24 are read and accompanying additional information, such as, for example, a CAN ID, is assessed. In the process, a communications structure describing the exchange of data 25 is also ascertained and assessed, especially a direction of the data flow in relation to the respectively associated network element 14. In addition, a status or behavior of network element 14 in relation to data 25 exchanged with communications network 18 is ascertained.

In addition, in block 54, exchanged data 25 or the status of network element 14 is respectively compared with predefined data 25 or a predefined status of network element 14 and assessed. If the comparison produces no data 25 assessed as being faulty or produces a faulty status of network element 14, the execution of the flow diagram continuously branches back to the input of block 54. At the same time, data 25 between first interface 12 and second interface 16 are passed on in unaltered form.

If exchanged data 25 and/or the status of network element 14 are at least partially assessed as being faulty, method 50 branches to a subsequent block 56. In block 56, data 25 may be partially altered or even blocked. A log describing faulty data 25 or the status of network element 14 is transmitted to control unit 22. In that manner, the availability of communications network 18 may be advantageously increased.

In a block 58 which follows, any information from control block 22 for initialization and/or configuration of connecting node 10 may be received. Thereafter, method 50 branches back to the input of block 54. The processing in block 58 may, where applicable, also be performed directly after the start (start block 52), for example at a first initialization of connecting node 10 and/or during operation of communications network 18.

In accordance with another preferred embodiment, connecting node 10 may fulfill at least one of the following functions or connecting node 10 has at least one of the following properties:

connecting node 10 may be fabricated inexpensively as a configurable ASIC and may preferably be installed in the wiring harness, for example in a wiring harness plug or alternatively in a housing of network element 14;

connecting node 10 is able to monitor the communications behavior of the respectively connected network element 14;

connecting node 10 operates transparently to network elements 14, that is to say, network elements 14 do not need to have any knowledge about connecting nodes 10;

connecting node 10 is able to enforce a predefined communications behavior by filtering out data packets that deviate from the preset. The following criteria are used as filtering criteria for the sending behavior of a network element 14:

the sending direction represents a part of the communications matrix, which part is specific to network element 14, the communications matrix being in the form of a development artifact, such as, for example, a CAN communications matrix or an AUTOSAR communications matrix;

the sending direction is recognized by a CAN ID for CAN networks or by an Ethernet address and/or an Internet Protocol, IP, address for Ethernet networks and/or Internet networks, respectively;

the time behavior of network element 14, for example a maximum number of messages per unit of time; and/or further criteria, for example a waiting time before the first message may be sent after the network initiation of network element 14.

initialization of connecting nodes 10, it optionally being possible for these to be configured in the network start phase. That makes it possible to remedy network problems by a restarting of communications network 18 as an alternative to a dynamic reconfiguration. In that operation, connecting nodes 10 are able to create an exclusive network mode for the configuration by disconnecting the respective network elements 14 from communications network 18 for that phase;

enforcement of a changed communications structure in communications network 18 (for example in a motor vehicle) as a dynamic reaction to overloads or other malfunctions in communications network 18. Changing the above-described filtering criteria;

making additional (optional) distributed network services possible, such as, for example:

signing of safety-critical bus messages. The bus messages to be sent which have a specific CAN ID or MAC/IP address and which are classified as safety-critical are recognized. For those bus messages, signatures are created (for example by the keyed-hash message authentication code, HMAC, method) and are sent with the messages;

verification of the safety-critical bus messages. The received bus messages having a specific CAN ID or MAC/IP address which are classified as safety-critical are recognized. Those bus messages are forwarded to network element 14 only after their signatures (e.g. HMAC) have been verified;

reporting a conspicuous behavior to control unit 22. In the event of a great deviation from the predefined communications behavior, a message is sent to control unit 22 with control information, such as, for example, a device ID, an error code or the like, via separate channel 42;

more complex connecting nodes 10 implement the authentication of network element 14, for example with a suitable "PUF" (physical unclonable function) method; and/or connecting nodes 10 check in addition the power supply line.

Control unit 22 according to the invention monitors and controls the functions of network elements 14. In so doing, control unit 22 is able to fulfill at least one of the following functions or control unit 22 has at least one of the following properties:

initialization of connecting nodes 10. Depending on the design of connecting nodes 10, they may be configured at every start ("start-up") of communications network 18;

specifying filter patterns for permitted and prohibited incoming and/or outgoing communication for the respective connecting nodes 10;

after recognition of a fault in network element 14, control unit 22 creates a new communications structure configuration which is distributed to the existing connecting nodes 10 upon restarting of the network. Control unit 22 is able to inform the driver of the detected problem and enquire about a restart via the instrument panel of the motor vehicle;

generating one or more cryptographic key(s) for safeguarding the communication;

specifying further control information, for example in relation to the permissible time behavior of network elements 14;

recognizing critical situations in communications network 18 and generating suitable reactions, such as, for example, a reconfiguration by a specified method;

coordinating and controlling connecting nodes 10 in accordance with the operating time of the system, for example with the aid of a reconfiguration;

more reliable logging of the critical events in combination with the above-described signing of the messages.

The communication between network elements 14 and connecting nodes 10 and between connecting nodes 10 and the remainder of communications network 18 takes place according to the same protocol in each case (CAN, Ethernet/IP). Connecting node 10 does not act as a communication participant. The control of connecting nodes 10 is effected via separate channel 42. An initiation phase of communications network 18 may be used for configuration of connecting nodes 10. In that operation, connecting nodes 10 disconnect network elements 14 from communications network 18 until a synchronization signal of control unit 22 has been received. Thus, an exclusive medium for the configuration of connecting nodes 10 is produced. In addition, other kinds of physical communication methods may be used on the same physical line. Channel 42 represents a separate physical line.

What is claimed is:

1. A connecting node for a communications network and for connection of a network element of the communications network to the communications network, the connecting node comprising:

a first interface for connection of the network element to the connecting node;

a second interface for connection of the connecting node to the communications network, wherein the connecting node is constructed to enable an exchange of data between the communications network and the network element via the first and second interfaces, and wherein the connecting node is constructed to at least one of read, alter, and block data exchanged between the communications network and the network element;
a circuit element comprising a memory; and
a data path for communicatively coupling the first interface and the second interface, wherein:
the network element is a control unit connected to other control units via the communications network,
the circuit element is connected to the data path by data lines,
the circuit element is configured to read additional information accompanying the data exchanged at the interfaces with the aid of the data lines and to continuously compare the additional information with presets stored in the memory,
the additional information includes at least one of a Controller Area Network (CAN) ID, an Ethernet address, and an Internet Protocol (IP) address, and
the circuit element is configured to alter data with the aid of the data lines and depending on the comparison.

2. The connecting node as recited in claim 1, further comprising:
a third interface for connection to a control unit.

3. The connecting node as recited in claim 2, wherein the connecting node is constructed to receive control commands from the control unit via the communications network without being received via the third interface or in addition to the third interface.

4. The connecting node as recited in claim 2, further comprising:
at least one data line via which the circuit element is connected to the data path.

5. The connecting node as recited in claim 2, further comprising:
a control line via which the third interface communicates with the circuit element.

6. The connecting node as recited in claim 1, wherein the connecting node is constructed to at least one of read, alter, and block data of at least one of an Open Systems Interconnection (OSI) 2 layer, an open systems interconnection, an OSI 3 layer, and an OSI 7 layer.

7. The connecting node as recited in claim 1, wherein the connecting node is constructed to perform at least one of the following functions:
reading and evaluating the additional information that is exchanged along with the exchanged data;
at least one of ascertaining, assessing, and altering a communications structure describing the exchange of data, including a direction of a data flow in relation to the network element;
ascertaining at least one of a status and a behavior of the network element in relation to the data exchanged with the communications network;
comparing at least one of the exchanged data, the status of the network element, and the behavior of the network element with at least one of predefined data, a predefined status, and a predefined behavior, respectively;
assessing at least one of the exchanged data, the status of the network element, and the behavior of the network element;
at least one of altering and blocking data, including data deviating from a preset;
supplementing data sent from the network element and having a signature;
checking the signature of data received via the communications network; and
forwarding the received data to the network element after the signature has been recognized as correct.

8. The connecting node as recited in claim 7, wherein the signature includes an Keyed-Hash Method Authentication Code (HMAC) method involving a keyed-hash message authentication code.

9. The connecting node as recited in claim 1, wherein the connecting node is constructed to log one of data that has been read and information derived therefrom.

10. The connecting node as recited in claim 1, wherein the connecting node is disposed one of in a wiring harness of the communications network and in a plug connector of the wiring harness of the communications network.

11. The connecting node as recited in claim 1, wherein:
the circuit element includes a memory that stores at least one preset,
the circuit element compares data on the data path with the at least one preset, and
the data is altered on the basis of the comparison.

12. The connecting node as recited in claim 1, wherein the circuit element is in the form of an application-specific integrated circuit (ASIC).

13. The connecting node as recited in claim 1, further comprising:
a first switch for opening and closing the data path; and
a second switch for opening and closing the data path.

14. The connecting node as recited in claim 13, wherein data is capable of being exchanged between the first interface and the second interface only when the first switch and the second switch are closed.

15. The connecting node as recited in claim 13, wherein the circuit element controls whether the first switch is opened or closed, and whether the second switch is opened or closed.

16. A control device for a communications network, comprising:
circuit for at least one of communicating with at least one connecting node and controlling the at least one connecting node, wherein the connecting node is for a communications network and for connection of a network element of the communications network to the communications network, the at least one connecting node comprising:
a first interface for connection of the network element to the connecting node; a second interface for connection of the connecting node to the communications network, wherein the connecting node is constructed to enable an exchange of data between the communications network and the network element via the first and second interfaces, and wherein the connecting node is constructed to at least one of read, alter, and block data exchanged between the communications network and the network element;
a circuit element comprising a memory; and
a data path for communicatively coupling the first interface and the second interface, wherein:
the network element is a control unit connected to other control units via the communications network,
the circuit element is connected to the data path by data lines, the circuit element is configured to read additional information accompanying the data exchanged at the interfaces with the aid of the data lines
and to continuously compare the additional information with presets stored in the memory,
the additional information includes at least one of a Controller Area Network (CAN) ID, an Ethernet address, and an Internet Protocol (IP) address, and the circuit element is configured to alter data with the aid of the data lines and depending on the comparison.

17. The control unit as recited in claim 16, wherein the control unit is constructed to perform the communication with the at least one connecting node at least partially at least one of in an encrypted manner and with the aid of a signature.

18. The control unit as recited in claim 16, wherein the control unit is constructed one of (1) to control the at least one connecting node at least one of via a channel that is separate from the communications network and via the communications network and (2) to communicate with the at least one connecting node via the channel and the communications network.

19. A communications network, comprising:
  circuit for connecting at least two network elements to each other, wherein at least one of the network elements is connected to the communications network via a connecting node, the connecting node comprising:
  a first interface for connection of the network element to the connecting node; a second interface for connection of the connecting node to the communications network, wherein the connecting node is constructed to enable an exchange of data between the communications network and the network element via the first and second interfaces, and wherein the connecting node is constructed to at least one of read, alter, and block data exchanged between the communications network and the network element;
  a circuit element comprising a memory; and a data path for communicatively coupling the first interface and the second interface, wherein:
  the at least one of the network elements is a control unit connected to other control units via the communications network,
  the circuit element is connected to the data path by data lines, the circuit element is configured to read additional information accompanying the data exchanged at the interfaces with the aid of the data lines and to continuously compare the additional information with presets stored in the memory,
  the additional information includes at least one of a Controller Area Network (CAN) ID, an Ethernet address, and an Internet Protocol (IP) address, and
  the circuit element is configured to alter data with the aid of the data lines and depending on the comparison.

20. The communications network as recited in claim 19, wherein the communications network corresponds to a bus system of a motor vehicle.

21. The communications network as recited in claim 19, wherein the at least one connecting node is disposed in the communications network as a supplement to a monitor disposed in the network element.

22. The communications network as recited in claim 19, wherein the communications network is constructed to transfer data using at least one of asynchronous and non-deterministic protocols, including Carrier Sense Multiple Access (CSMA) protocols in one of a Controller Area Network (CAN) bus system, an Ethernet system, and an IP system.

23. A method for operating a communications network including means for connecting at least two network elements to each other, wherein at least one of the network elements is connected to the communications network via a connecting node, the connecting node comprising a first interface for connection of the network element to the connecting node; a second interface for connection of the connecting node to the communications network; a circuit element comprising a memory; and a data path for communicatively coupling the first interface and the second interface, wherein the connecting node is constructed to enable an exchange of data between the communications network and the network element via the first and second interfaces, and wherein the connecting node is constructed to at least one of read, alter, and block data exchanged between the communications network and the network element, the method comprising:
  with the use of a control unit, an independent channel, and the connecting node, data between the communications network and at least one network element are at least one of read, altered, and blocked, wherein:
  the network element is a control unit connected to other control units via the communications network,
  the circuit element is connected to the data path by data lines,
  the circuit element is configured to read additional information accompanying the data exchanged at the interfaces with the aid of the data lines and to continuously compare the additional information with presets stored in the memory,
  the additional information includes at least one of a Controller Area Network (CAN) ID, an Ethernet address, and an Internet Protocol (IP) address, and
  the circuit element is configured to alter data with the aid of the data lines and depending on the comparison.

24. The method as recited in claim 23, wherein in the event of at least one of a malfunction and an overloading of the communications network, a communications structure of the communications network is altered by the at least one connecting node being controlled by the control unit.

* * * * *